United States Patent [19]

Jones

[11] 4,335,662
[45] Jun. 22, 1982

[54] SOLID FUEL FEED SYSTEM FOR A FLUIDIZED BED

[75] Inventor: Brian C. Jones, Windsor, Conn.

[73] Assignee: Combustion Engineering, Inc., Windsor, Conn.

[21] Appl. No.: 186,924

[22] Filed: Sep. 12, 1980

[51] Int. Cl.³ .............................................. F23D 1/00
[52] U.S. Cl. .................................. 110/263; 110/245
[58] Field of Search ...................... 110/263, 347, 245; 122/4 D; 431/7, 170; 165/104.16

[56] References Cited

U.S. PATENT DOCUMENTS 4,102,277  7/1978  Wall ................................ 110/245 X
4,249,472  2/1981  Mitchell .............................. 110/245
4,279,222  7/1981  Pearce ............................. 110/263 X Primary Examiner—Edward G. Favors
Attorney, Agent, or Firm—Arthur L. Wade

[57] ABSTRACT

A fluidized bed for the combustion of coal, with limestone, is replenished with crushed coal from a system discharging the coal laterally from a station below the surface level of the bed. A compartment, or feed box, is mounted at one side of the bed and its interior separated from the bed by a weir plate beneath which the coal flows laterally into the bed while bed material is received into the compartment above the plate to maintain a predetermined minimum level of material in the compartment.

9 Claims, 1 Drawing Figure

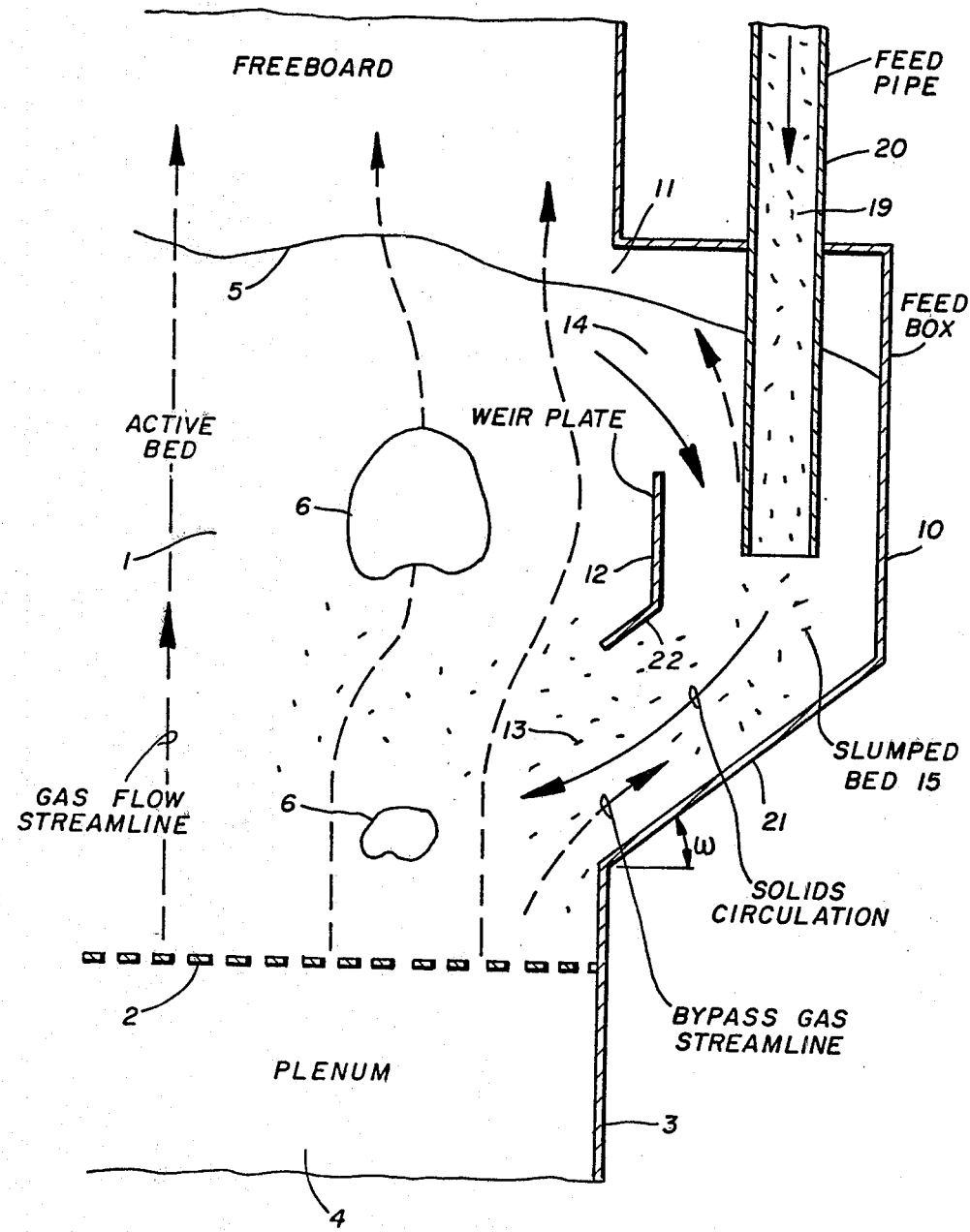

SOLID FUEL FEED SYSTEM FOR A FLUIDIZED BED

The Government of the United States of America has rights in this invention pursuant to Contract No. EX-76-C-01-2473 awarded by the U.S. Department of Energy.

TECHNICAL FIELD

The present invention relates to a system with which to laterally feed solid fuel from a non-fluidized slumped bed into a fluidized bed in which combustion of the fuel takes place. More particularly, the invention relates to establishing a slumped bed of solid material into which crushed coal and limestone is fed. The slumped bed feeds the crushed coal and limestone into the side of a combusting fluidized bed by a combination of hydrostatic and gravity forces.

BACKGROUND ART

Various approaches have been developed to replenish combusting fluidized beds with solid fuel. Basically, the solid fuel is crushed and distributed through the bed while the bed is being violently agitated by fast rising bubbles of fluidizing air from forced draft fans. It is desired to supply fresh solid fuel with an arrangement to minimize elutriation of fines into the entraining gaseous products of combustion, obviate the formation of carbon monoxide, and absorb the sulfur compounds by limestone in the bed. Faced with the violence, or turbulance, with which the solid fuel is combusted during the upward flow of bubbles of fluidizing air, the introduction of fresh supplies of crushed solid fuel and makeup limestone is difficult to provide without aggravating the problems of elutriating fines, carbon monoxide formation, and sulfur escape.

The pneumatic transport of crushed solid fuel and limestone into the combusting fluidized bed is a well-known system. The inherent disadvantage of this feed arrangement is its need for numerous and complex transport pipes whose discharge ends are stationed through the bed. The pneumatically transported solid material has a penchant for clogging their conducting pipes, creating a vicious maintenance problem. Additionally, transport air released at the feed nozzles in the bed, has a tendency to channel through the bed and thereby limit the residence time and lateral mixing of the fresh fuel within the bed with the result that sub-stoichiometric combustion is possible and elutriation of fines is enhanced.

Overbed feed systems for crushed, solid fuel and limestone have been developed. Without the agitation of transport air, many of the problems of elutriation and sub-stoichiometric combustion would appear to be mitigated. However, the descent of fresh supplies of solid material on the top of the combusting fluidized bed has large quantities of the fines elutriated into the freeboard above the bed without contact with the combustion temperature of the bed. The products of combustion, and partial combustion, are quickly cooled by the heat exchange surfaces above the bed freeboard, allowing the escape of carbon monoxide and sulfur compounds.

A third approach offers a higher potential for a satisfactory feed system. In this third approach, crushed solid fuel is accumulated into a slumped bed adjacent a combusting fluidized bed from which the fluidized bed is laterally fed, along with any necessary makeup limestone. The degree of turbulence, as an inherent characteristic of the combusting fluidized bed, provides the force for lateral distribution of the fresh fuel through the bed, once the fresh fuel flows into the bed. More specifically, the combusting fluidized bed can be regarded as boiling, in that bubbles of fluidizing air rise violently through the bed and force the solid crushed fuel laterally across the bed after the fuel has been fed into the side of the bed. Attractive as this side-feed system appears, the provision of a slumped bed at the side of the fluidized bed gives rise to problems in applying forces to consistently feed the fresh fuel from the slumped bed into the fluidized bed.

DISCLOSURE OF THE INVENTION

The present invention contemplates a compartment, or feed box, adjacent to the combusting fluidized bed of solid fuel and limestone. A weir plate is placed at the interface between a slumped bed in the compartment and the active fluidized bed. The placement and form of the weir plate is, basically, to isolate the slumped bed in the compartment from the fluidizing air of the active bed. The weir plate, additionally, is shaped and arranged to provide a lower exit from the compartment, spaced a predetermined distance below the top of the active bed, and an access opening between the upper portion of the active bed and the compartment interior. Fresh fuel is flowed into the compartment and to within a predetermined distance from the lower exit to limit the residence time for travel of the fuel in the compartment to the active bed in order to prevent volatilization of the solid fuel and its ignition within the compartment. The upper opening provides a flow of material from the active fluidized bed to maintain the height of the slumped bed in the compartment which, together with the higher density of the slumped bed in the compartment, will generate the hydrostatic force to continuously feed fresh fuel and makeup limestone into the active bed.

Other objects, advantages, and features of the invention will become apparent to one skilled in the art upon consideration of the written specification, appended claims and accompanying drawing.

BRIEF DESCRIPTION OF THE DRAWING

The drawing is a somewhat diagrammatic sectioned elevation of a fluidized combusting bed with a fuel feed system embodying the present invention.

BEST MODE FOR CARRYING OUT THE INVENTION

General Considerations

The fluidized bed is now a well-known structure with which to combust crushed solid fuel, of which coal is the primary example. Within a suitable furnace, a perforated support structure is extended horizontally across the lower region of the furnace. Forced draft fans supply air up through the perforated structure with a velocity greater than the minimum fluidizing velocity, which results in the formation of gas bubbles rising in the bed.

The larger portion of the bed is crushed limestone. The weight ratio of limestone-to-coal is quite large in order to insure that the limestone has sufficient contact with the combusting coal to form calcium sulfate with sulfur usually contained in the coal at the combusting temperature range of 1500–1600 F. The bed, predominantly limestone, is violently agitated during combustion by gas bubbles forced up through the bed. Hopefully, few of the coal or limestone particles in the bed are elutriated into the gaseous products of combustion discharged into the freeboard above the bed. An objective is to draw the gaseous products of combustion from the freeboard above the bed into downstream contact with heat exchange surfaces through which water is usually converted into steam for useful purposes. Obviously, it is highly desirable that combustion be completed within the bed, leaving low levels of carbon monoxide, sulfur compounds, and solid material in the gases eventually discharged to the atmosphere. The present invention is embodied in a feed system for fresh fuel and limestone flowed from a slumped bed communicated through a station at the side of the fluidized bed.

In the drawing, the fluidized bed 1 is shown as supported by a perforated, or foraminous, structure 2. Structure 2 extends horizontally across the lower portion of a furnace whose wall is indicated at 3. The complete furnace of wall 3 is not disclosed. In general, a section of the furnace below structure 2 is designated a plenum 4. It is up through this plenum 4 that a fan, not shown, forces air through bed 1 positioned above structure 2.

The bed is shown as being fluidized by the flow of air. The violent activity of the bed, during combustion, is difficult to accurately depict. The top of this bed is represented at 5, but it must be appreciated that this upper limit of a bed of crushed solid material is literally boiling from the upflowing gas bubbles 6 and the activity of combustion taking place throughout the bed.

Compartment, or Feed Box

To provide a station from which crushed coal and makeup limestone can be fed into bed 1, a compartment 10 is mounted on wall 3 to contain a slumped bed from which the fuel and limestone will be fed. In the drawing, the compartment 10 is shown in section. The complete arrangement and shape of the box may be that it is elongated to extend along one complete side of an active fluidized bed 1. To so extend, the box may be quite lengthy in a horizontal direction, as viewed in the drawing. Therefore, the fresh fuel and limestone flowed from compartment 10 may come into bed 1 along one side and spread horizontally through the active bed.

As a beginning, compartment 10 is to be viewed as mounted on wall 3 and open to the active bed at 11. Weir plate 12 is placed at 11 and shaped and arranged to, basically, isolate the interior of compartment 10 from the fluidizing combustion air flow. Weir plate 12 is vertically oriented and extended horizontally the length of compartment 10. Further, weir plate 12 is dimensioned to leave an opening 13 beneath its lower edge, and an opening 14 above its upper edge. The basic function of weir plate 12 is to isolate fluidizing activity of bed 1 from the slumped bed 15 maintained in compartment 10. Therefore, the slumped bed 15 in compartment 10 will maintain a significantly greater density relative to bed 1, because the slumped bed is not fluidized. Communication between the two beds is restricted to openings 13 and 14.

The composition of slumped bed 15 is made up from two sources. New, or fresh, crushed coal and limestone 19 are supplied the lower portion of slumped bed 15 within compartment 10 through conduit 20. A specific source of this material is not shown. For the purposes of the present disclosure, it is sufficient to indicate that conduit 20 directs this material 19 into compartment 10. Obviously, more than one such conduit could be provided if compartment 10 was given a large horizontal dimension. In either event, the fuel and limestone are gravitated into the compartment 10 and directed into the lower portion of slumped bed 15. The second source of slumped bed material is that flow of solids through opening 14 from active bed 1.

Although the active bed and the slumped bed are comprised of solid materials of small size, the materials may be viewed as flowing. Therefore, as bodies of fluid-like material, the forces of their movement are termed hydrostatic. Therefore, there is a consideration of hydrostatic forces in properly flowing the slumped bed material into active bed 1 through opening 13. On the one side of weir plate 12 is the active fluidized bed 1 extending up to level 5. The hydrostatic head of this fluidized material must be overcome at opening 13.

The slumped bed 15 is more dense, or heavier, than the fluidized material of bed 1. However, it must also have a head to combine with this density to force the slumped bed material at opening 13 into active bed 1.

Opening 14 provides the flow of material from bed 1 into compartment 10 above weir plate 12. Once this material, predominantly limestone, flows into compartment 10, the level of the slumped bed 15 is elevated to provide the needed head to flow material from the lower part of the slumped bed through opening 13. Essentially, a circulation is established clockwise around weir plate 12. The continuous flow of solids from active bed 1 through opening 14 unbalances the hydrostatic forces across opening 13 to flow material from the slumped bed 15 into active bed 1. Therefore, fresh crushed coal and makeup limestone continuously fed into the lower portion of slumped bed 15 is caught up in the circulation flow around weir plate 12 and carried through opening 13 into active bed 1 as its feed.

It is critical that the fresh fuel is not heated hot enough to volatilize enough of the fuel to threaten ignition within compartment 10. There are several factors which govern the residence time of the fresh fuel within the compartment 10. As previously indicated, the size of the openings 13 and 14 establish the rate of circulation of the solid materials flowing from bed 1 through opening 14 and into bed 1 through opening 13. The geometry of weir plate 12 determines the size of the openings above and below it. Next, the distance between the discharge end of conduit 20 and lower opening 13 is a factor in establishing the residence time. Also, the slope of the bottom of compartment 10 toward opening 13 is a factor. Thus, there are these several geometrical factors, under the concepts of the invention, that bear upon the critical residence time of the fresh fuel within compartment 10.

The slumped bed 15 flows along the bottom 21 of compartment 10. Bottom 21 is sloped at the angle omega which will add the force of gravity to the hydrostatic force feeding the lower portion of slumped bed 15 through opening 13. It is expected that the sizes for openings 13 and 14 will communicate compartment 10 with active fluidized bed 1 for the flow of bed material without bypassing combustion air into compartment 10 which would fluidize the slumped bed 15 and, thereby, reduce its density.

As the slumped bed material moves through opening 13 of compartment 10, a downward momentum is imparted to the material. The angle Omega of bottom 21 dictates the direction of this momentum as the slumped bed material is circulated into fluidized bed 1. Structural supplementation of the downwardly directed momentum is provided by a lip 22 on the lower edge of weir plate 12 which is extended parallel to compartment bottom 21. In effect, the lip 22 and bottom 21 form a nozzle, or channel, directed at the angle Omega, which gives added momentum and direction to the slumped bed material fed into the fluidized bed through opening 13. This results in a deeper penetration of slumped bed material and fresh fuel fed into the lower region of active bed 1, than would be provided without the downwardly oriented nozzle, or channel, as disclosed at opening 13. The deeper penetration of fresh fuel fed into the active fluidized bed increases the residence time and corresponding combustion efficiency of the fresh fuel fed in the active bed.

Conclusion

The present invention adds to the technology of slumped bed arrangement and operation. The high density of a non-fluidized slumped bed is a significant hydrostatic force to establish a differential in hydrostatic heads between the slumped bed and the adjacent active fluidized bed. A sloping bottom for the slumped bed will apply the force of gravity to the slumped bed material in flowing the material toward the feed opening into the active bed.

The present invention establishes a circulating flow between the slumped bed and active fluidized bed. This circulating flow may be characterized as pinwheeling around a weir plate, forming an interface between the two beds. Fresh fuel is fed into this pinwheel as it flows from the slumped bed compartment into the active fluidized bed. Thus, the head of the slumped bed is maintained by continuous supply of material from the active fluidized bed. This maintained head and maintained density difference energizes the pinwheel into which is fed the fresh fuel.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawing is to be interpreted in an illustrative and not in a limiting sense.

I claim:

1. A feed system for a combusting fluidized bed, including,
   a bed which includes crushed solid fuel to be burned,
   a source of air for combustion flowing up through the bed in the form of bubbles and fluidizing the bed during combustion,
   a compartment structure positioned at one side of the active fluidized bed,
   a wall with an upper and a lower opening between the active fluidized bed and the compartment,
   a slumped bed positioned within the compartment receiving solid material from the upper portion of the active fluidized bed through the upper opening in the wall to maintain a hydrostatic head difference between the slumped bed and active fluidized bed at the lower opening between the compartment and active bed,
   and means for supplying fresh solid fuel to a point below the level of the slumped bed and a predetermined distance from the lower wall opening to avoid a residence time for the fresh fuel in the compartment which would cause volatilization and ignition of the fuel and to establish a flow of the fresh fuel into the fluidized bed with material of the slumped bed passed through the lower opening with the force of the hydrostatic heads.

2. The feed system of claim 1, wherein,
   the bottom of the compartment is sloped toward the lower opening at the angle which will flow the slumped bed material and fresh fuel toward the lower opening at a rate which will limit the residence time of the fresh fuel in the compartment to prevent volatilization of the fresh fuel and ignition of the volatilized fuel in the compartment.

3. The feed system of claim 1, wherein,
   the sizes of the upper and lower openings in the wall are sized to establish the rate of flow of slumped bed material through the compartment which will limit the residence time of the fresh fuel in the compartment which will avoid volatilization of the fresh fuel and its ignition within the compartment.

4. A fuel feed system for a fluidized bed combustor, including,
   a furnace having a vertical wall,
   a perforated support extending horizontally across the lower portion of the furnace,
   a bed of crushed solid material including fuel contained within the furnace walls and on the perforated support,
   a source of fluidizing air connected to the furnace to direct the air up through the furnace and the supported bed in the form of bubbles at a velocity which fluidizes the bed,
   a feed box compartment mounted on the furnace wall extending below the level of the fluidized bed,
   a weir plate member extending horizontally between the interior of the feed box compartment and the active fluidized bed,
   a first aperture below the weir plate communicating the interior of the feed box compartment with the active fluidized bed,
   a second aperture above the weir plate and communicating the upper portion of the active fluidized bed to the interior of the feed box compartment,
   a slumped bed positioned in the feed box compartment and isolated from the fluidizing air of the active bed,
   and means connected to the compartment for supplying crushed solid fuel and $SO_2$ absorbent to the slumped bed at a location below the level of the slumped bed in the compartment and spaced from the lower aperture to limit the residence time of the fuel in the compartment,
   whereby solid material from the upper portion of the active fluidized bed flows through the second aperture to maintain the level of the slumped bed high enough that its head and density will be greater than that of the active fluidized bed to result in the flow of slumped bed material and crushed solid fuel from the lower portion of the compartment through the first aperture into the active fluidized bed.

5. The feed system of claim 4, wherein, the active fluidized bed is comprised of a large proportion of limestone as an $SO_2$ absorbent and the bottom of the feed box compartment is sloped toward the first aperture at an angle which will cause the slumped bed to gravitate toward the first aperture.

6. The feed system of claim 4, in which, the apertures are sized to establish a flow of upper active fluidized bed material into the compartment and a flow of slumped bed material from the compartment which will limit the residence time of the crushed solid fuel in the compartment.

7. A fuel feed system for a fluidized bed combusting crushed coal mixed with limestone, including, a wall extending vertically to contain the combusting fluidized bed, an aperture in the wall extending downward from the upper level of the active fluidized bed, a feed box compartment mounted over the wall aperture, a plate extended in a vertical plane over the aperture to function as an interface between the active fluidized bed and the feed box compartment, a first access opening between the upper portion of the active fluidized bed and the feed box interior, a slumped bed positioned within the interior of the feed box compartment formed by the flow of material through the first access opening to a height which will provide a head which will unbalance the force between the lower portion of the slumped bed and the active fluidized bed, a second access opening between the lower portion of the feed box interior and the active fluidized bed through which material from the lower portion of the slumped bed will flow under the unbalance of head forces between the fluidized bed and the slumped bed, and a supply of fresh crushed solid fuel and limestone connected to flow into the lower portion of the slumped bed at a location below the level of the slumped bed and a predetermined distance from the second access opening to avoid a residence time for the fresh fuel in the compartment which would volatilize and ignite the fresh fuel and to mix with the circulating material of the slumped bed and flow through the second access opening into the active fluidized bed.

8. The feed system of claim 7, in which, the bottom of the feed box compartment is extended at an angle to the horizontal from the second access opening which will apply the force of gravity to flow slumped bed material in its lower portion toward the second access opening.

9. The feed system of claim 8, including, a lip extending from the bottom edge of the plate toward the active fluidized bed and parallel the bottom of the feed box compartment in forming a downwardly directed nozzle to impart momentum in a downward direction within the fluidized bed to the material flowing from the bottom of the slumped bed.

* * * * *